United States Patent
Muller et al.

(10) Patent No.: US 11,300,335 B2
(45) Date of Patent: Apr. 12, 2022

(54) REFRIGERATION APPARATUS INCLUDING LUBRICATION OF COMPRESSOR WITH REFRIGERANT

(71) Applicant: Carrier Corporation, Palm Beach Gardens, FL (US)

(72) Inventors: Raphael Muller, Lyons (FR); Antoine Barriere, Villeurbanne (FR)

(73) Assignee: CARRIER CORPORATION, Palm Beach Gardens, FL (US)

( * ) Notice: Subject to any disclaimer, the term of this patent is extended or adjusted under 35 U.S.C. 154(b) by 0 days.

(21) Appl. No.: 16/871,626

(22) Filed: May 11, 2020

(65) Prior Publication Data
US 2020/0370801 A1    Nov. 26, 2020

(30) Foreign Application Priority Data
May 21, 2019   (EP) .................................... 19175799

(51) Int. Cl.
*F25B 41/06*    (2006.01)
*F25B 31/00*    (2006.01)
*F25B 41/31*    (2021.01)

(52) U.S. Cl.
CPC .......... *F25B 31/004* (2013.01); *F25B 31/002* (2013.01); *F25B 41/31* (2021.01);
(Continued)

(58) Field of Classification Search
CPC ...... F25B 31/002; F25B 31/004; F25B 41/31; F25B 2500/16; F25B 2500/28;
(Continued)

(56) References Cited

U.S. PATENT DOCUMENTS 4,375,156 A    3/1983 Shaw
4,478,054 A *  10/1984 Shaw ...................... F25B 1/047
                                                     62/323.4
(Continued)

FOREIGN PATENT DOCUMENTS

EP    1400765 A2    3/2004
WO    2017183644 A1  10/2017
WO    2018038926 A1   3/2018

OTHER PUBLICATIONS

European Search Report for application EP 19175799.6, dated Oct. 25, 2019, 6 pages.

*Primary Examiner* — Jonathan Bradford
(74) *Attorney, Agent, or Firm* — Cantor Colburn LLP

(57) ABSTRACT

A refrigeration apparatus (1) includes a main refrigerant circuit (2) including a positive displacement compressor (4), a condenser (6), an expansion valve (8), and an evaporator (10), through which a refrigerant circulates successively in a closed loop circulation, a lubrication refrigerant line (18) connected to the main refrigerant circuit (2) between the condenser (6) and the expansion valve (8) or to the condenser (6), in which circulates a portion of the refrigerant of the main refrigerant circuit (2) and connected to the compressor (4) for lubrication of the compressor (4) with the refrigerant. The lubrication refrigerant line (18) includes, upstream from the compressor (4): a throttle valve (20) adapted to vary the lubrication refrigerant flow entering the compressor (4), a downstream pressure detector (30) configured to measure refrigerant pressure (P3) downstream the throttle valve (20) and upstream the compressor (4).

15 Claims, 4 Drawing Sheets

(52) U.S. Cl.
CPC ....... *F25B 2500/16* (2013.01); *F25B 2500/28* (2013.01); *F25B 2600/2513* (2013.01); *F25B 2700/1933* (2013.01); *F25B 2700/21151* (2013.01); *F25B 2700/21155* (2013.01); *F25B 2700/21156* (2013.01)

(58) Field of Classification Search
CPC ...... F25B 2600/2513; F25B 2700/1933; F25B 2700/21151; F25B 2700/21155; F25B 2700/21156
See application file for complete search history.

(56) References Cited

U.S. PATENT DOCUMENTS

| | | | | |
|---|---|---|---|---|
| 5,050,389 | A * | 9/1991 | Wigmore | G05D 23/1912 62/84 |
| 5,469,713 | A * | 11/1995 | Wardle | F04C 29/02 62/193 |
| 6,176,092 | B1 * | 1/2001 | Butterworth | F04D 29/023 62/193 |
| 6,898,948 | B2 * | 5/2005 | Roelke | F04C 18/16 62/505 |
| 8,397,534 | B2 * | 3/2013 | Doty | F25B 1/053 62/505 |
| 10,962,263 | B2 * | 3/2021 | Sishtla | F25B 31/002 |
| 11,022,351 | B2 * | 6/2021 | Sishtla | F25B 31/002 |
| 2004/0050081 | A1 * | 3/2004 | Tsuboi | F25B 1/047 62/197 |
| 2012/0198868 | A1 * | 8/2012 | Huff | F25B 9/008 62/115 |
| 2015/0323226 | A1 * | 11/2015 | Haraki | F25B 13/00 62/324.1 |

* cited by examiner

REFRIGERATION APPARATUS INCLUDING LUBRICATION OF COMPRESSOR WITH REFRIGERANT

FOREIGN PRIORITY

This application claims priority to European Patent Application No. 19175799.6, filed May 21, 2019, and all the benefits accruing therefrom under 35 U.S.C. § 119, the contents of which in its entirety are herein incorporated by reference.

BACKGROUND

The present invention concerns a refrigeration apparatus.

A refrigeration apparatus is known from EP 1 400 765, comprising a refrigerant circuit including a screw compressor, a condenser, an expansion valve and an evaporator. This known apparatus comprises a bypass flow passage, branching at a part of said refrigerant circuit between the condenser and the expansion valve, routing through throttle means, and communicating with a rotor cavity and with bearings of the screw compressor. Lubrication of the compressor is achieved by the same fluid that is also used as refrigerant in the circuit, and in the absence of oil.

For successfully lubricating the rotor cavity and the bearings, one must ensure that a significant part of the lubrication refrigerant reaching the rotor cavity and bearings is in a liquid state and at a minimal flow. This is usually the case when the refrigerating apparatus is operating at high load, corresponding in particular to a high flow of refrigerant. When the refrigerating apparatus is operating at full load, the refrigerant emitted by the condenser is generally entirely in a liquid state, or in a bi-phase state with little proportion of refrigerant in a gaseous state.

However, if the need for refrigeration is lower, the apparatus may be operating at low load, including in particular a smaller flow of refrigerant. During low load operation of the apparatus, it may happen that the refrigerant circulating through the bypass flow passage is not entirely in liquid state and contains a non-negligible proportion of refrigerant in gaseous state, or even a high proportion of refrigerant in gaseous state. Since refrigerant in a gaseous state is not able to achieve sufficient lubrication of the compressor, there is a risk of damaging or destroying the compressor due to a lack of lubrication during low load operation of the apparatus.

At the same time, the refrigerant flow towards the rotor cavity must stay below a maximal flow, provided that in case too much liquid refrigerant is injected in the rotor cavity, the rotor cavity may be flooded leading to potential damages on the compressor.

SUMMARY

An aim of the invention is to provide a refrigeration apparatus where injection of lubrication refrigerant in the compressor is monitored and controlled to insure satisfactory lubrication of the compressor by means of the refrigerant even during low load operation of the refrigeration apparatus.

To this end, the invention concerns a refrigeration apparatus comprising: a main refrigerant circuit including a positive displacement compressor, a condenser, an expansion valve, and an evaporator, through which a refrigerant circulates successively in a closed loop circulation; a lubrication refrigerant line connected to the main refrigerant circuit between the condenser and the expansion valve or to the condenser, in which circulates a portion of the refrigerant of the main refrigerant circuit and connected to the compressor for lubrication of said compressor with the refrigerant.

The lubrication refrigerant line comprises, upstream from the compressor: a throttle valve adapted to vary the lubrication refrigerant flow entering the compressor, a downstream pressure detector configured to measure refrigerant pressure downstream the throttle valve and upstream the compressor, a downstream temperature detector configured to measure refrigerant temperature downstream the throttle valve and upstream the compressor, and the refrigeration unit comprises a control unit adapted to determine the state of the refrigerant in the lubrication refrigerant line using the measurements of the downstream pressure detector and the downstream temperature detector, and configured for controlling the throttle valve on the basis of at least the pressure downstream the throttle valve and the state of the refrigerant in the lubrication refrigerant line.

Thanks to the invention, the characteristics of the flow of refrigerant injected in the compressor are monitored and can be controlled to insure that it is in liquid state and in sufficient flow for any load of the refrigerating apparatus. In particular, the flow of refrigerant is controlled by applying a pressure drop, and the state of the refrigerant is monitored downstream the throttle valve using the pressure and temperature to insure that the refrigerant is in liquid state.

According to further aspects of the invention that are advantageous but not compulsory, such a refrigeration apparatus may incorporate one or several of the following features: The lubrication refrigerant line separates into a compression chamber line, a suction side bearing line and a discharge side bearing line that are respectively connected to a compression chamber within said compressor, to a suction side bearing cavity within said compressor and to a discharge side bearing cavity within said compressor, and the throttle valve, the downstream pressure detector and the downstream temperature detector are connected at least to the compression chamber line. The compression chamber line and the suction side bearing line are connected to the lubricant refrigerant line downstream the throttle valve, the downstream pressure detector and the downstream temperature detector, while the discharge side bearing line is connected to the lubricant refrigerant line upstream the throttle valve, the downstream pressure detector and the downstream temperature detector. The compression chamber line, the suction side bearing line and the discharge side bearing line are connected to the lubricant refrigerant line downstream the throttle valve, the downstream pressure detector and the downstream temperature detector. The refrigeration apparatus comprises a pressure detector configured to measure the refrigerant pressure in the discharge side bearing cavity. The refrigeration apparatus comprises at least one refrigerant recovery line connected to the discharge side bearing cavity or to the suction side bearing cavity and returning refrigerant to the evaporator or to a line of the main refrigerant circuit connecting the expansion valve to the evaporator. The refrigeration apparatus comprises temperature detection means for detecting the temperature of at least one of suction side bearings within the compressor or discharge side bearings within the compressor. The lubrication refrigerant line is connected, via a motor line, to a motor cavity of the compressor which houses a motor of the compressor. The motor line is connected to the lubrication refrigerant line upstream or downstream the throttle valve, the downstream pressure detector and the downstream temperature detector. The refrigeration apparatus comprises a temperature detector of the temperature of the motor. The compressor is chosen between at least a scroll compressor, a screw compressor, a piston compressor, a rotary compressor. The refrigeration apparatus operates an oil free refrigerant cycle. The throttle valve is a pulsation-controlled valve. The refrigeration apparatus comprises an upstream pressure detector configured to measure refrigerant pressure upstream the throttle valve, and the throttle valve is a fixed-positions valve or a continuous valve operating a pressure drop controlled by the control unit on the basis of the upstream pressure and the downstream pressure. The control unit is configured to control the expansion valve of the main refrigerant circuit using the measurements of the downstream pressure detector and the downstream temperature detector.

DRAWING DESCRIPTION

Exemplary embodiments according to the invention and including further advantageous features of the invention are explained below, in referenced to the attached drawings, in which.

DETAILED DESCRIPTION

Figure 1:
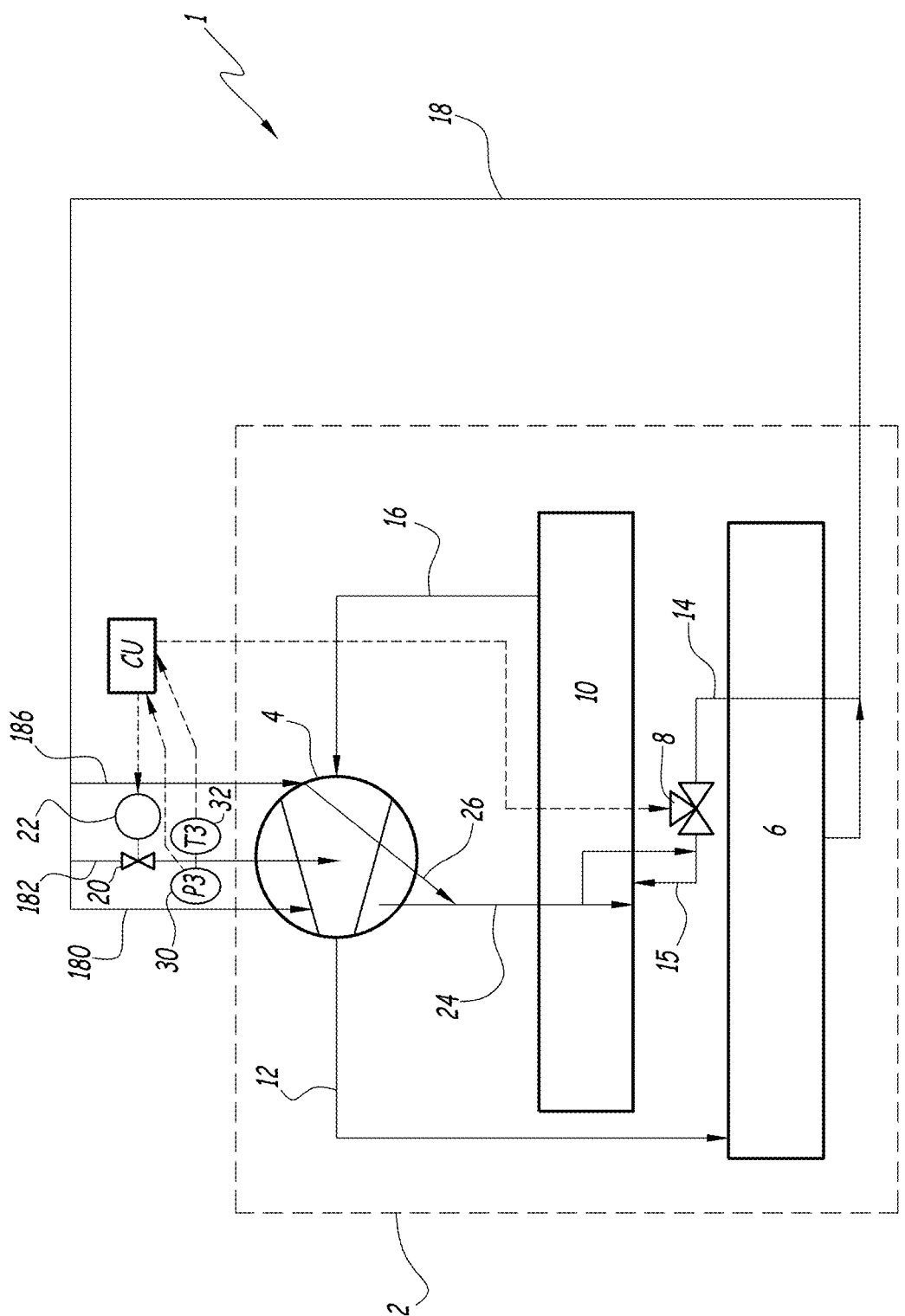
FIG. 1 is a synoptic drawing showing a refrigeration apparatus according to a first embodiment of the invention.

FIG. 1 represents a refrigeration apparatus 1, comprising a main refrigerant circuit 2 through which a refrigerant circulates in a closed loop circulation. The main refrigerant circuit 2 comprises four main components: a positive displacement compressor 4, also called volumetric compressor, a condenser 6, an expansion valve 8, and an evaporator 10. The refrigerant circulates successively in these four components according to a thermodynamic cycle.

Preferably, in a steady-state, during high load operation of the refrigeration apparatus 1: in the compressor 4, the refrigerant is in a gaseous state, and is compressed from a low pressure to a high pressure, which raises the temperature of the refrigerant from a low temperature to a high temperature; in a discharge line 12 connecting the compressor 4 to the condenser 6, the refrigerant is in a gaseous state, or essentially gaseous state, and is at the high temperature and the high pressure; in the condenser 6, the refrigerant is in a bi-phasic state, including gaseous and liquid refrigerant, and is condensed to a liquid state by the condenser 6; in a line 14 connecting the condenser 6 to the expansion valve 8, the refrigerant is in a liquid state, or essentially liquid state, is at the high pressure, and may be at the high temperature or at a temperature between the high temperature and the low temperature; in the expansion valve 8, the refrigerant is brought to the low pressure, which lowers the temperature of the refrigerant to the low temperature while evaporating the refrigerant to the bi-phasic state; in a line 15 connecting the expansion valve 8 to the evaporator 10, the refrigerant is in a biphasic-state, where a major part is liquid and a smaller part is gaseous, and the refrigerant is at a low temperature and a low pressure; in the evaporator 10, the refrigerant is in a bi-phasic state, including gaseous and liquid refrigerant, and is evaporated to a gaseous state by the evaporator 10; in a suction line 16 connecting the evaporator 10 to the compressor 4, the refrigerant is in a gaseous state, or essentially gaseous state, at the low pressure and at a low temperature, or at a temperature between the low and the high temperature.

For example, the low temperature is approximately between 5-10° C., the high temperature is approximately between 35-40° C., the low pressure is approximately between 3-4 bar, and the high pressure is approximately between 6-10 bar.

Considering the above, the main circuit 2 comprises a high-pressure part, consisting in the discharge line 12, the condenser 6 and the line 14, and a low-pressure part, consisting in the line 15, the evaporator 10 and the suction line 16.

In a part of the main circuit 2, which covers only a portion of the high-pressure part, preferably consisting in the condenser 6 and the line 14, the refrigerant is mostly in liquid state and high pressure.

The positive-displacement compressor 4 may be chosen between at least a scroll compressor, a screw compressor, a piston compressor, a rotary compressor, or a Roots compressor.

Figure 2:
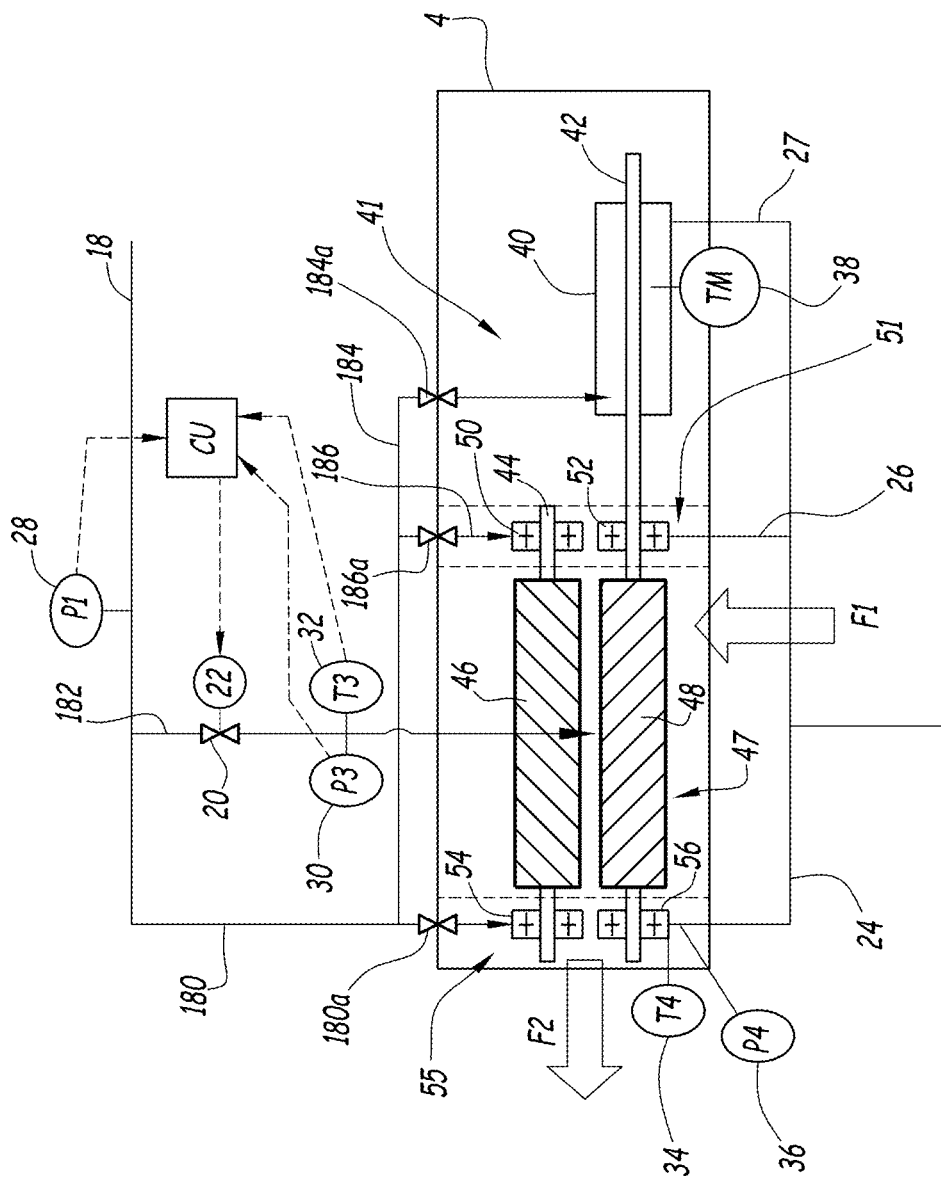
FIG. 2 is a synoptic drawing showing only a part of the refrigeration apparatus of FIG. 1 including a compressor and a lubrication refrigerant line.

According to one embodiment, the compressor 4 is a screw compressor. As represented on FIG. 2, the compressor 4 comprises a motor 40, powered by a non-shown power supply, which may be of an electrical type. The motor 40 drives a primary shaft 42, whose rotation is supported by bearings 52 and 56. A first screw 48 is mounted on the primary shaft 42 and is driven in rotation by the primary shaft 42. The compressor 4 comprises a secondary shaft 44, whose rotation is supported by bearings 50 and 54, and which drives in rotation a second screw 46. The screws 46 and 48 mesh together in male-female cooperation under action of the motor 40. The compressor 4 comprises a compression chamber 47, in which the screws 46 and 48 are located. The gaseous refrigerant enters the compression chamber 47 along an arrow F1 from the suction line 16. The bearings 50 and 52 located on the suction side of the compression chamber 47 are called suction bearings. The suction bearings 50 and 52 are located in a cavity of the compressor 4 that forms a suction side bearing cavity 51. The gaseous refrigerant compressed by the meshed screws 46 and 48 is discharged from the compressor along the direction indicated by arrow F2 towards the discharge line 12. The bearings 54 and 56 located on the discharge side of the compression chamber 47 are called discharge bearings. The discharge bearings 54 and 56 are located in a cavity of the compressor 4 that forms a discharge side bearing cavity 55.

To insure proper operation of the compressor 4, it is essential that the meshing screws 46 and 48 in the compression chamber 47 and the bearings 50, 52, 54, 56 in the cavities 51 and 55 are sufficiently lubricated with a liquid lubricant.

The refrigerant of the refrigeration apparatus 1 is a fluid material chosen to ensure both functions of refrigerant and lubricant. Preferably, the refrigerant used in the apparatus is a hydrofluoroolefin (HFO), for example R1234ze (1,3,3,3-tetrafluoroprop-1-ene). There is therefore no lubrication oil present in the main refrigerant circuit 2. The refrigeration apparatus 1 is operating an oil-free refrigerant cycle.

In the condenser 6 and between the condenser 6 and the expansion valve 8, where the refrigerant of the main circuit 2 it mostly in liquid state and at high pressure, is the part of the main circuit 2 where the refrigerant is in the most appropriate state to be used as lubricant.

The refrigeration apparatus 1 comprises a lubrication refrigerant line 18 connected between the condenser 6 and the expansion valve 8, and connected to the compressor 4 for lubrication of said compressor 4 with the liquid refrigerant. According to a non-shown embodiment, the lubrication refrigerant line 18 may be connected to the condenser 6, for example in a bottom area of the condenser 6.

The lubrication refrigerant line 18 separates into a compression chamber line 182, a suction side bearing line 186 and a discharge side bearing line 180 that are respectively connected to the compression chamber 47, to the suction side bearing cavity 51 and to the discharge side bearing cavity 55 so that refrigerant is provided to the screws 46 and 48, and to the bearings 50, 52, 54, 56.

The lubrication refrigerant line 18 comprises, upstream from the compressor 4: a throttle valve 20 adapted to vary the lubrication refrigerant flow entering the compressor 4, an upstream pressure detector 28 configured to measure refrigerant pressure P1 upstream the throttle valve 20, a downstream pressure detector 30 configured to measure refrigerant pressure P3 downstream the throttle valve 20 and upstream the compressor 4, a downstream temperature detector 32 configured to measure refrigerant temperature T3 downstream the throttle valve 20 and upstream the compressor 4.

The terms "upstream" and "downstream" are employed in reference to the direction of circulation of the liquid refrigerant in the lubrication refrigerant line 18 towards the compressor 4.

The throttle valve 20 allows controlling the flow of refrigerant that circulates in the lubrication refrigerant line 18 upstream the compressor 4, by creating a loss of charge, or pressure drop $\Delta P$. This pressure drop $\Delta P$ corresponds to the difference between the downstream pressure P3 and the upstream pressure P1. For instance, P1 may be comprised between 6 and 10 bars, and the pressure drop $\Delta P$ between P1 and P3 may be equal to 0,2 bar.

The throttle valve 20 may be a step valve with at least to fixed opening positions. In such a case, the pressure drop $\Delta P$ of the throttle valve 20 may have one or more fixed values, depending on the number of fixed positions. Alternatively, the throttle valve 20 may be a motorized valve with continuous liquid balancing, i.e. with the possibility of continuously adjusting the $\Delta P$ value.

Monitoring the upstream pressure P1 and the pressure drop $\Delta P$ allows checking that the quantity of refrigerant flowing towards the compressor 4 is always at a required minimum even during reduced load operation, but also that the flow of refrigerant does not exceed a limit above which a hazard of drowning the compression chamber 47 with liquid refrigerant occurs. When an excessive amount of refrigerant in liquid state is present in the compression chamber 47, the screws 46 and 48 may be damaged, with a fatal consequence to the compressor 4 which bears a substantial part in the cost of the refrigeration apparatus 1.

The monitoring of the pressures P1 and P3 has also the goal of checking that the liquid refrigerant pressure does not drop below a limit value under which flash evaporation of the refrigerant may occur, causing potentially harmful reduction of the lubrication efficiency of the refrigerant.

The monitoring of the downstream pressure P3 and the downstream temperature T3 allows determining the state of the refrigerant downstream the throttle valve 20, in view of checking that the refrigerant is in liquid state before entering the compressor 4, as the compressor 4 always needs a certain flow of liquid refrigerant for proper lubrication.

The refrigeration apparatus 1 comprises means for controlling the throttle valve 20 on the basis of the pressure P1 upstream the throttle valve 20 and the pressure P3 downstream the throttle valve 20. The means for controlling the throttle valve 20 are preferably formed by a motor 22 controlling an opening degree of the throttle valve 20. The motor 22 preferably implements a control according to a pressure drop curve in which the value of the pressure drop $\Delta P$ increases when the refrigerant flow increases.

The refrigeration apparatus 1 may comprise a control unit CU that receives the pressure data P1, P3 and the temperature data T3. The control unit CU may be connected electrically to the pressure detectors 28 and 30 and to the temperature sensor 32, or may receive the pressure data P1, P3 and the temperature data T3 wirelessly. The motor 22 may receive control signals from the control unit CU on the basis of the values of P1 and P3. The control unit CU may implement calculations to determine the state of the refrigerant in the lubrication line 18 using the values of P3 and T3, and emit signals or trigger specific procedures if the refrigerant is determined to be, as requested, in liquid state, or if the refrigerant is bi-phasic and comprises a too large proportion of gas. For example, the control unit CU may take into account the state of the refrigerant when controlling the throttle valve 20. When the throttle valve 20 is commanded to reduce the refrigerant flow, the control unit CU sets the reduction to a level sufficient to keep the refrigerant in liquid state, and controls the effect on the state of the refrigerant of the reduction using the values of P3 and T3.

As shown on FIG. 1, the control unit CU may also control an opening degree of the expansion valve 8 based on the values of P3 and T3 to insure that the refrigerant is in liquid state.

According to one embodiment, the throttle valve 20, the upstream pressure detector 28, the downstream pressure detector 30 and the downstream temperature detector 32 are connected on the compression chamber line 182. In such a case, only the flow of refrigerant coming into the compression chamber 47 is monitored and controlled. The discharge side bearing line 180 is connected to the lubricant refrigerant line 18 and to the compression chamber line 182 downstream from the upstream pressure detector 28, and upstream the throttle valve 20, the downstream pressure detector 30 and the downstream temperature detector 32. The suction side bearing line 186 may be connected to the discharge side bearing line 180.

The flow of lubrication refrigerant in the discharge side cavity 55 and the suction side cavity 51 may be controlled by flow restriction devices 180a and 186a respectively connected on the discharge side bearing line 180 and on the suction side bearing line 186. The flow restriction devices 180a and 186a may be calibrated orifices designed to allow passage of a predetermined flow of refrigerant.

The discharge side bearing cavity 55 is generally sealed from the compression chamber 47, meaning that the refrigerant present in the compression chamber 47 cannot migrate towards the discharge side bearing cavity 55. However, in some cases, the discharge side bearing cavity 55 and the compression chamber 47 may be in fluid communication. The suction side bearing cavity 51 and the compression chamber 47 are generally in fluid communication.

According to an optional embodiment, the refrigeration apparatus 1 may comprise a pressure detector 36 configured to measure the refrigerant pressure P4 in the discharge side bearing cavity 55. This pressure detector 36 is used to check that the pressure P4 does not exceed a threshold. If the pressure P4 is too high, this may indicate that a non-desired and harmful backflow of refrigerant from the discharge recovery line 24 may be occurring.

The rate between P1 and P4 may also be monitored to check that a minimal lubrication flow for the discharge bearings 54 and 56 is met.

According to an optional embodiment, the refrigeration apparatus 1 may comprise temperature detection means 34 for detecting the temperature T4 of the discharge bearings 54 and 56. According to a non-shown embodiment, the refrigeration apparatus 1 may also comprise temperature detection means for the suction bearings 50 and 52, or temperature detection means for either the suction bearings 50 and 52, or the discharge bearings 54 and 56. This permits to monitor the heating of the bearings of the compressor 4 and potentially to warn about a potential lack of lubrication of the bearings.

According to another optional embodiment, the refrigeration apparatus 1 comprises a discharge recovery line 24 connected to the discharge side bearing cavity 55, and a suction recovery line 26 connected to the suction side bearing cavity 51. The discharge recovery line 24 and the suction recovery line 26 allow draining lubrication refrigerant from the bearing cavities 55 and 51, and returning the lubrication refrigerant to the low pressure part of the main refrigerant circuit 2, for example to the evaporator 10, where it will be vaporized, and/or to the line 15 between the expansion valve 8 and the evaporator 10.

According to an optional embodiment, the lubrication refrigerant line 18 may be connected, via a motor line 184, to a motor cavity 41 of the compressor 4 which houses the motor 40 of the compressor 4. This allows cooling down the motor 40 with the flow of lubrication refrigerant. The motor line 184 may be connected to the lubrication refrigerant line 18 upstream the throttle valve 20, the upstream pressure detector 28, the downstream pressure detector 30 and the downstream temperature detector 32, via the discharge bearing line 180 as represented on FIG. 2, or downstream (non-shown). The flow of lubrication refrigerant towards the motor 40 may be controlled by a flow restriction device 184a connected on the motor line 184, for example a calibrated orifice.

According to an optional embodiment, the refrigeration apparatus 1 may comprise a temperature detector 38 of the temperature TM of the motor 40.

According to an optional embodiment, the refrigeration apparatus 1 may comprise a motor recovery line 27 connected to the motor cavity 41, for returning lubrication refrigerant circulating in the motor cavity 41 for cooling purpose to the evaporator 10.

Figure 3:
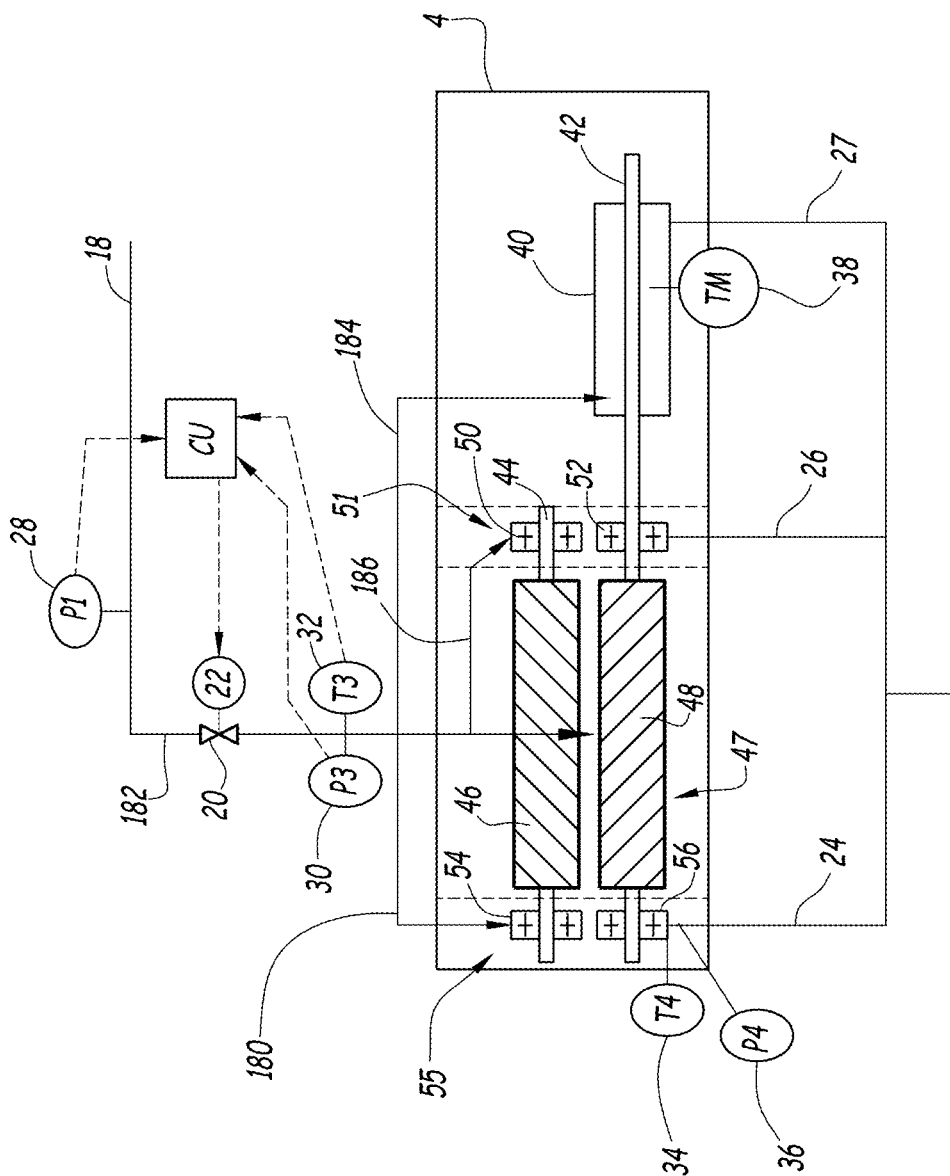
FIG. 3 is a synoptic drawing similar to FIG. 2, showing only a part of a refrigeration apparatus according to a second embodiment of the invention.

A second embodiment of the invention is represented on FIG. 3. In this embodiment, elements common to the embodiment of FIGS. 1 and 2 have the same references and work in the same way. In this embodiment, the compression chamber line 182, the suction side bearing line 186 and the discharge side bearing line 180 are connected to each other downstream the throttle valve 20, the upstream pressure detector 28, the downstream pressure detector 30 and the downstream temperature detector 32. This means that the global lubrication refrigerant flow that enters the compressor 4 is monitored and controlled. The flows of lubrication refrigerant that enter the compression chamber 47, the suction bearing cavity 51 and the discharge bearing cavity 55 are therefore not monitored and controlled individually. The compression chamber 47, the suction bearing cavity 51 and the discharge bearing cavity 55 have therefore a common lubricant injection line.

In such a case, the control unit CU may implement a control of the throttle valve 20 that take into account not only the pressures P1 and P3, but also the pressure P4, the temperature T4 and the temperature TM. The throttle valve 20 may be controlled so that the temperatures T4 and TM stay below respective threshold values corresponding to optimal operating temperatures of the discharge bearings 54 and 56 and of the motor 40.

According to a non-shown embodiment, the refrigeration apparatus 1 may comprise only the motor recovery line 27, and no refrigerant recovery line connected to the bearing cavities 51 and 55.

Figure 4:
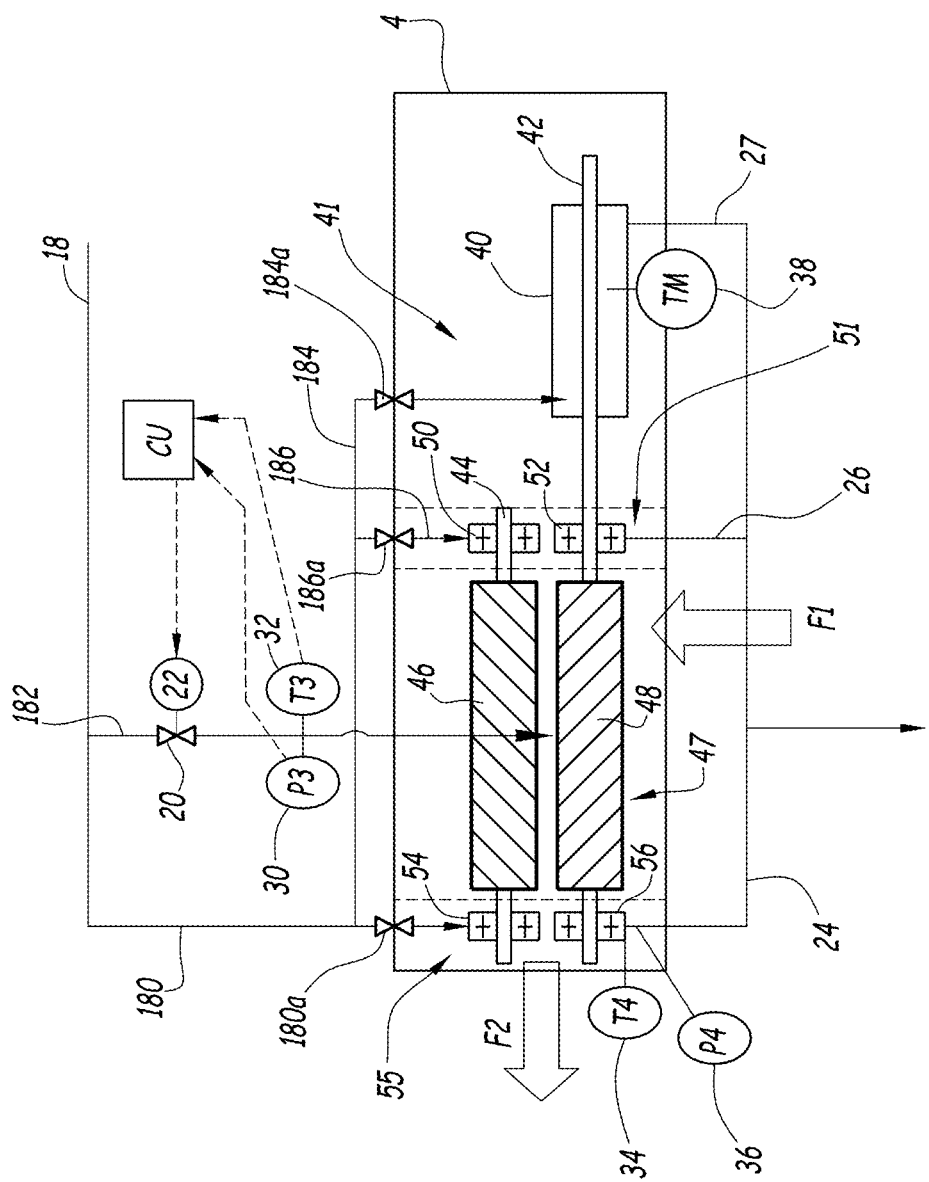
FIG. 4 is a synoptic drawing similar to FIG. 2, showing only a part of a refrigeration apparatus according to a third embodiment of the invention.

A third embodiment of the invention is represented on FIG. 4. In this embodiment, the refrigeration apparatus 1 does not include an upstream pressure detector 28. In such a case, the throttle valve 20 may be a pulsation valve, being controlled along sequences of fully opened configuration and fully closed configuration. Such a throttle valve embodiment does not need the value of the upstream pressure P1. The throttle valve of the pulsation type may be controlled by the control unit CU using pulse width modulation technique.

When the throttle valve 20 is a pulsation valve, only the downstream pressure P3 and the downstream temperature T3 may be used to check the liquid state of the refrigerant.

According to a non-shown embodiment of the invention, the lubrication refrigerant line 18 may be connected to the compression chamber 47 only. In such a case, only the rotors (for example, the screws 46 and 48) of the compressor 4 would be supplied with a direct flow of liquid refrigerant for lubrication, while the bearings 50, 52, 54 and 56 may be lubricated with other means or with a lubrication refrigerant flow distinct from the lubrication refrigerant line 18.

The technical features of the above described embodiments and variants may be combined to form new embodiments of the invention within the scope of the claims.

What is claimed is:

1. A refrigeration apparatus comprising:
   a main refrigerant circuit including a positive displacement compressor, a condenser, an expansion valve, and an evaporator, through which a refrigerant circulates successively in a closed loop circulation;
   a lubrication refrigerant line connected to the main refrigerant circuit between the condenser and the expansion valve or to the condenser, in which circulates a portion of the refrigerant of the main refrigerant circuit and connected to the compressor for lubrication of said compressor with the refrigerant;
   wherein the lubrication refrigerant line comprises, upstream from the compressor:
   a throttle valve adapted to vary the lubrication refrigerant flow entering the compressor,
   a downstream pressure detector configured to measure refrigerant pressure downstream the throttle valve and upstream the compressor,
   a downstream temperature detector configured to measure refrigerant temperature downstream the throttle valve and upstream the compressor,
   and wherein the refrigeration apparatus comprises a control unit adapted to determine a state of the refrigerant in the lubrication refrigerant line using the measurements of the downstream pressure detector and the downstream temperature detector, and configured for controlling the throttle valve on the basis of at least the pressure downstream the throttle valve and the state of the refrigerant in the lubrication refrigerant line.

2. The refrigeration apparatus according to claim 1, wherein the lubrication refrigerant line separates into a compression chamber line, a suction side bearing line and a discharge side bearing line that are respectively connected to a compression chamber within said compressor, to a suction side bearing cavity within said compressor and to a discharge side bearing cavity within said compressor, and wherein the throttle valve, the downstream pressure detector and the downstream temperature detector are connected at least to the compression chamber line.

3. The refrigeration apparatus according to claim 2, wherein the compression chamber line and the suction side bearing line are connected to the lubricant refrigerant line downstream the throttle valve, the downstream pressure detector and the downstream temperature detector, while the discharge side bearing line is connected to the lubricant refrigerant line upstream the throttle valve, the downstream pressure detector and the downstream temperature detector.

4. The refrigeration apparatus according to claim 2, wherein the compression chamber line, the suction side bearing line and the discharge side bearing line are connected to the lubricant refrigerant line downstream the throttle valve, the downstream pressure detector and the downstream temperature detector.

5. The refrigeration apparatus according to claim 2, wherein the refrigeration apparatus comprises a pressure detector configured to measure the refrigerant pressure in the discharge side bearing cavity.

6. The refrigeration apparatus according to claim 2, wherein the refrigeration apparatus comprises at least one refrigerant recovery line connected to the discharge side bearing cavity or to the suction side bearing cavity and returning refrigerant to the evaporator or to a line of the main refrigerant circuit connecting the expansion valve to the evaporator.

7. The refrigeration apparatus according to claim 1, wherein the refrigeration apparatus comprises temperature detection means for detecting the temperature of at least one of suction side bearings within the compressor or discharge side bearings within the compressor.

8. The refrigeration apparatus according to claim 1, wherein the lubrication refrigerant line is connected, via a motor line, to a motor cavity of the compressor which houses a motor of the compressor.

9. The refrigeration apparatus according to claim 8, wherein the motor line is connected to the lubrication refrigerant line upstream or downstream the throttle valve, the downstream pressure detector and the downstream temperature detector.

10. The refrigeration apparatus according to claim 8, wherein the refrigeration apparatus comprises a temperature detector of the temperature of the motor.

11. The refrigeration apparatus according to claim 1, wherein the compressor is chosen between at least a scroll compressor, a screw compressor, a piston compressor, a rotary compressor.

12. The refrigeration apparatus according to claim 1, wherein the refrigeration apparatus operates an oil free refrigerant cycle.

13. The refrigeration apparatus according to claim 1, wherein the throttle valve is a pulsation-controlled valve.

14. The refrigeration apparatus according to claim 1, wherein the refrigeration apparatus comprises an upstream pressure detector configured to measure refrigerant pressure upstream the throttle valve, and wherein the throttle valve is a fixed positions valve or a continuous valve operating a pressure drop controlled by the control unit on the basis of the upstream pressure and the downstream pressure.

15. The refrigeration apparatus according to claim 1, wherein the control unit is configured to control the expansion valve of the main refrigerant circuit using the measurements of the downstream pressure detector and the downstream temperature detector.

\* \* \* \* \*